US009092432B2

(12) United States Patent
Li

(10) Patent No.: US 9,092,432 B2
(45) Date of Patent: Jul. 28, 2015

(54) ENHANCED METADATA IN MEDIA FILES

(76) Inventor: De Xiong Li, Sunnyvale, CA (US)

(*) Notice: Subject to any disclaimer, the term of this patent is extended or adjusted under 35 U.S.C. 154(b) by 115 days.

(21) Appl. No.: 12/931,051

(22) Filed: Jan. 20, 2011

(65) Prior Publication Data

US 2011/0184964 A1    Jul. 28, 2011

Related U.S. Application Data

(60) Provisional application No. 61/296,479, filed on Jan. 20, 2010.

(51) Int. Cl.
*G06F 17/30* (2006.01)

(52) U.S. Cl.
CPC ............................. *G06F 17/30017* (2013.01)

(58) Field of Classification Search
CPC ................ G06F 17/30749; G06F 17/30017; G06F 17/30265; G06F 17/30743; G06F 17/30752
USPC ........................................................ 707/756
See application file for complete search history.

(56) References Cited

U.S. PATENT DOCUMENTS

| | | | | |
|---|---|---|---|---|
| 2003/0195863 A1* | 10/2003 | Marsh | ............................... | 707/1 |
| 2004/0126038 A1* | 7/2004 | Aublant et al. | ............... | 382/305 |
| 2004/0243685 A1* | 12/2004 | Sabiers et al. | ................ | 709/212 |
| 2007/0162568 A1* | 7/2007 | Gupta et al. | ................... | 709/219 |
| 2009/0157680 A1* | 6/2009 | Crossley et al. | .................. | 707/6 |
| 2010/0332958 A1* | 12/2010 | Weinberger et al. | .......... | 715/201 |
| 2011/0125847 A1* | 5/2011 | Cocheu et al. | ................ | 709/204 |

* cited by examiner

*Primary Examiner* — Yuk Ting Choi
(74) *Attorney, Agent, or Firm* — Bo-In Lin

(57) ABSTRACT

In various embodiments, enhanced metadata for media files is provided. In one embodiment, a method is provided. The method includes receiving metadata and media data of a plurality of media data files. The method also includes combining the media data of the plurality of media data files into a combined media data file. The method further includes associating metadata of the plurality of media data files with the combined media data file. The method also includes adjusting the metadata of the plurality of media data files as associated with the combined media data file to reflect segments of the combined media data file corresponding to the plurality of media data files. The method may further include each media data file of the plurality of media data files including segments having metadata associated therewith and the combined media data file including metadata associated with each segment of the plurality of media data files.

14 Claims, 12 Drawing Sheets

|   | Media Segments | Metadata |
|---|---|---|
| 1 | Media data 1 | Metadata 1 |
| 2 | Media data 2 | Metadata 2 |
| 3 | Media data 3 | Metadata 3 |
| ... | ... | ... |
| N | Media data N | Metadata N |

| 1 | 2 | 3 | 4 | 5 | 6 | 7 | 8 | ... | N |
|---|---|---|---|---|---|---|---|---|---|
| M1 | M2 | M3 | M4 | M5 | M6 | M7 | M8 | ... | M10 |
| D1 | D2 | D3 | D4 | D5 | D6 | D7 | D8 | ... | D10 |

ENHANCED METADATA IN MEDIA FILES

CLAIM OF PRIORITY

This application claims priority to U.S. Provisional Application No. 61/296,479, filed on Jan. 20, 2010, which is hereby incorporated herein by reference.

BACKGROUND

Prior attempts to handle metadata generally allow one to provide relatively static data for a media file or media data. One can expect to have a single location for a picture, for example. Similarly, one can expect to have a single location for a video file or sound file. However, as technology has improved, it has become possible to capture data for media files which is much richer than the metadata envisioned for earlier technology.

Additionally, in prior times, storage was a very expensive resource. Thus, adding a few bytes of data to provide properties for a photograph was reasonable, but adding a lot of information to a photograph would have severely constrained limited storage resources However, storage technology has also improved, allowing for storage of much more data in a camera, for example, than many computers once had access to. Some approaches to handling metadata have been tried, such as those found in U.S. Pat. No. 7,525,578 and U.S. Patent Application No. 20060257122.

However, it may be useful to provide a method of handling metadata on a much larger scale than has been handled in the past.

BRIEF DESCRIPTION OF THE DRAWINGS

The present invention is illustrated by way of example in the accompanying drawings. The drawings should be understood as illustrative rather than limiting.

FIG. 13 illustrates an example of a data structure for media data with enhanced metadata in an embodiment.

FIG. 14 illustrates another example of a data structure for media data with enhanced metadata in an embodiment.

DETAILED DESCRIPTION

Figure 1:
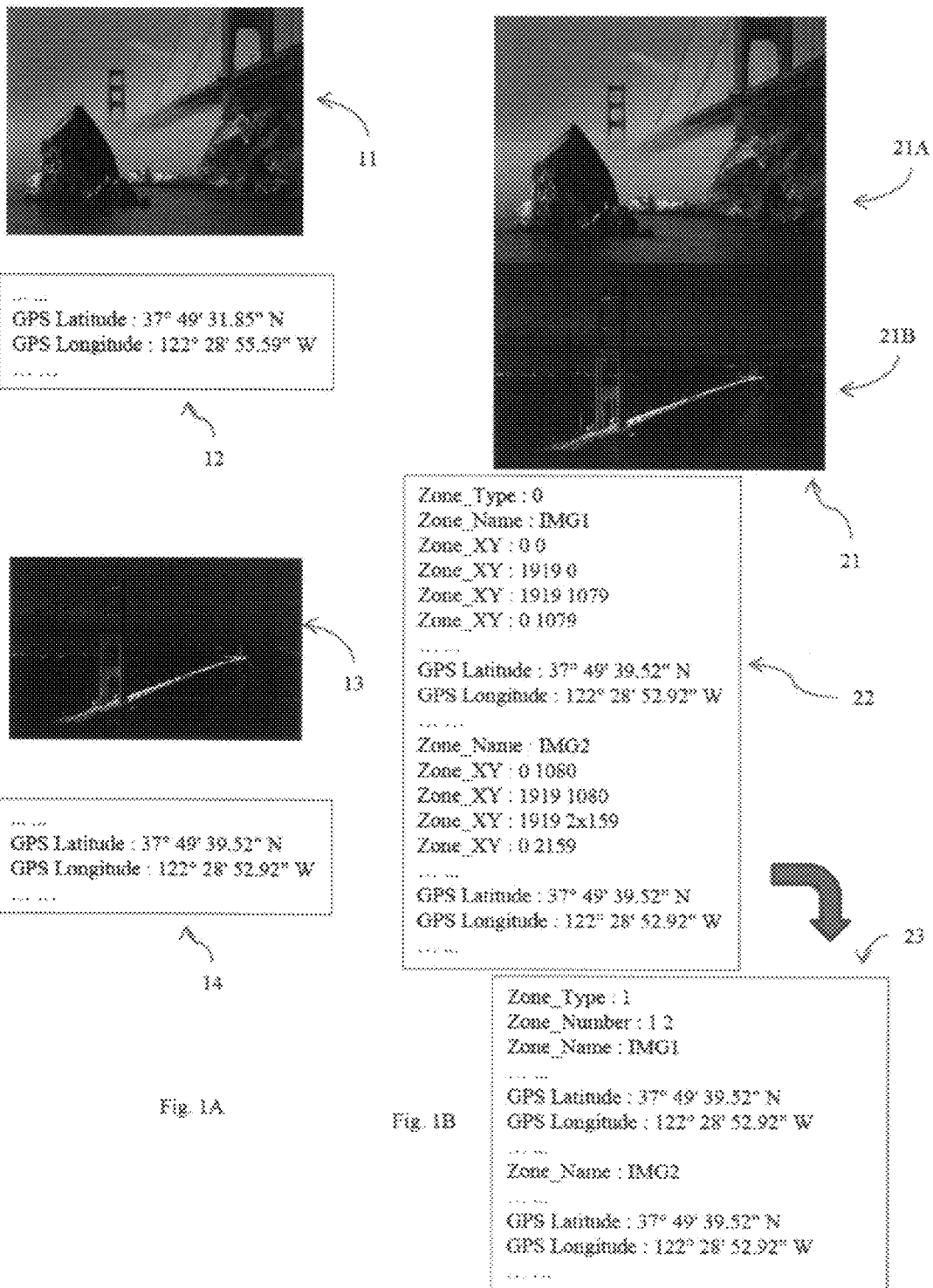
FIG. 1A illustrates two separate images and accompanying metadata in an embodiment.
FIG. 1B illustrates two separate images and accompanying metadata as combined in an embodiment.

A system, method and apparatus is provided for enhanced metadata in media files. The specific embodiments described in this document represent example embodiments of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

One may handle metadata in a variety of ways, and may expand that metadata for media files using improved technology. New devices such as smartphones (e.g. the iPhone available from Apple Computer of Cupertino, Calif.) have much more capabilities for gathering data in a simple way. Storage technology allows us to store much more information than we once did. Moreover, access to data is a much more common facet of life than it used to be, when computer networks were accessed only through desktop computers or terminals, for example.

Note that media data as described herein can refer to a number of different things. For example, it may include video, audio, photographs, still images, text, recordings of web surfing sessions, or other types of media. Thus, one should understand media data to refer to data which can be accessed in segments.

In one embodiment, a method is provided. The method includes receiving metadata and media data of a plurality of media data files. The method also includes combining the media data of the plurality of media data files into a combined media data file. The method further includes associating metadata of the plurality of media data files with the combined media data file. The method also includes adjusting the metadata of the plurality of media data files as associated with the combined media data file to reflect segments of the combined media data file corresponding to the plurality of media data files. The method may further include each media data file of the plurality of media data files including segments having metadata associated therewith and the combined media data file including metadata associated with each segment of the plurality of media data files.

The media data of each media data file may be image data of a photograph or other image data, video data, audio data, text data, or recordings of a web surfing session, for example. Also, the media data may be drawn from two or more different types of media data.

In another embodiment, a method is provided. The method includes capturing media data over time. The method also includes capturing a variety of metadata associated with the media data over time. The method further includes associating the metadata with the media data in a media data file.

In yet another embodiment, a method is provided. The method includes requesting data from an external device. The method also includes capturing media data. The method further includes receiving data from the external device. The method also includes associating the data from the external device with the media data.

The method may further include requesting and receiving the data of the external device through a network. The method may also include requesting and receiving the data of the external device directly from the external device. The method may include both approaches to requests for multiple external devices as well.

In another embodiment, a method is provided. The method includes receiving a request to access media data associated with specified metadata. The method also includes finding the specified metadata of the media data. The method further includes looking up a media data segment corresponding to the specified metadata. The method also includes providing the media data segment.

The method may further involve providing including displaying the media data segment. The method may also involve providing including playing the media data segment. The method may further include providing include highlighting the media data segment. The method may also involve providing including playing the media data segment and media data segments sequentially following the media data segment.

One may consider various examples to better understand how metadata may be enhanced for media files. FIG. 1A illustrates two separate images and accompanying metadata in an embodiment. Image 11 shows one view of a bridge. Metadata 12 provides GPS coordinates for the location where the picture was taken. Similarly, image 13 shows another view of the same bridge. GPS coordinates are part of the metadata of data 14, which is the data associated with image 13.

FIG. 1B illustrates two separate images and accompanying metadata as combined in an embodiment. When the two images are combined into a single image, one may combine the metadata so that the original metadata for each image is preserved and available. Image 21 includes two media segments or images 21A and 21B, corresponding to original images 11 and 13. Metadata 22 includes information about image 21, defining two segments or zones based on x-y coordinates in the image. Corresponding metadata is provided for each segment or zone from the original metadata for the underlying images. Similarly, metadata 23 provides another example of more condensed metadata. Here, two zones are defined and names, with corresponding original metadata included. Such names may be expected to refer to coordinates or other identifiers of parts of a media file. For other types of media file, coordinates may be based on other information. For example, in an audio file, a time index may provide a coordinate for a segment (or a pair of time indices, e.g.) As another example, in a video file, a byte range or byte index into the file may provide the coordinate for association of metadata, for example.

Figure 9:
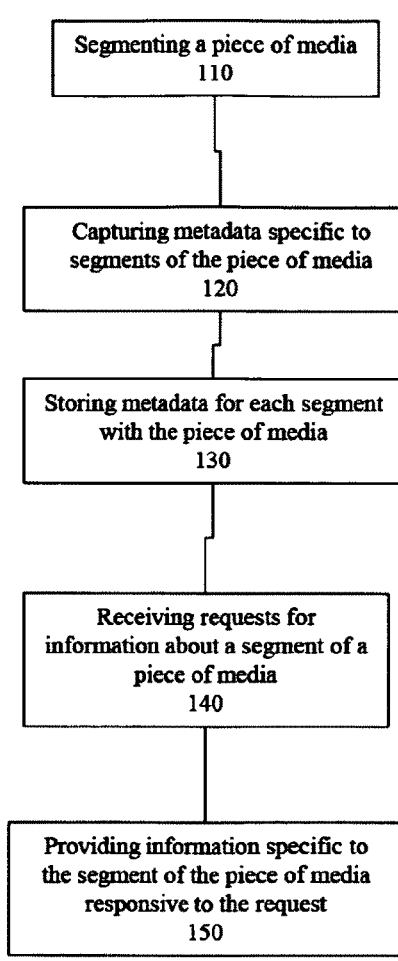
FIG. 9 illustrates an example of a process of storing and providing enhanced metadata in an embodiment.

FIG. 9 illustrates an example of a process of storing and providing enhanced metadata in an embodiment. Process 100 and other methods of this document are composed of modules which may be rearranged into parallel or serial configurations, and may be subdivided or combined. The method may include additional or different modules, and the modules may be reorganized to achieve the same result, too. Process 100 provides a process of attaching metadata to segments of a media file, and thereby potentially providing enhanced metadata for the media file.

Process 100 begins with segmenting a piece of media at module 110. This may involve choosing zones in an image or timeslices in a video or audio file, for example. It may also involve choosing byte ranges for a file, rather than other indices, for example. In situations where media data is captured contemporaneously with metadata, changes in location or narration may result in segments, as well as user input indicating a new segment should begin.

At module 120, metadata specific to the individual segments of the media is captured. For a real-time process (e.g. where media data and metadata is captured contemporaneously or essentially simultaneously), this may involve simply including timestamps or pointers in the metadata pointing to the segments of the media data in question. For situations where the media data was previously captured, this may involve including pointers to the media data in the newly configured metadata. At module 130, the metadata for each segment is stored along with the media data, either in an associated file or within the same file in some embodiments. Note that modules 120 and 130 may provide an iterative loop for individual segments, or may be used to handle all segments of a media file at once in various embodiments.

With the metadata available, one may then use the metadata for various segments of a media file in various ways. At module 140, a request for information about a segment of a piece of media is received. The information in the metadata responsive to that request is provided at module 150, such as by looking up what metadata includes the part of the media which is associated with the request, for example.

Figure 2:
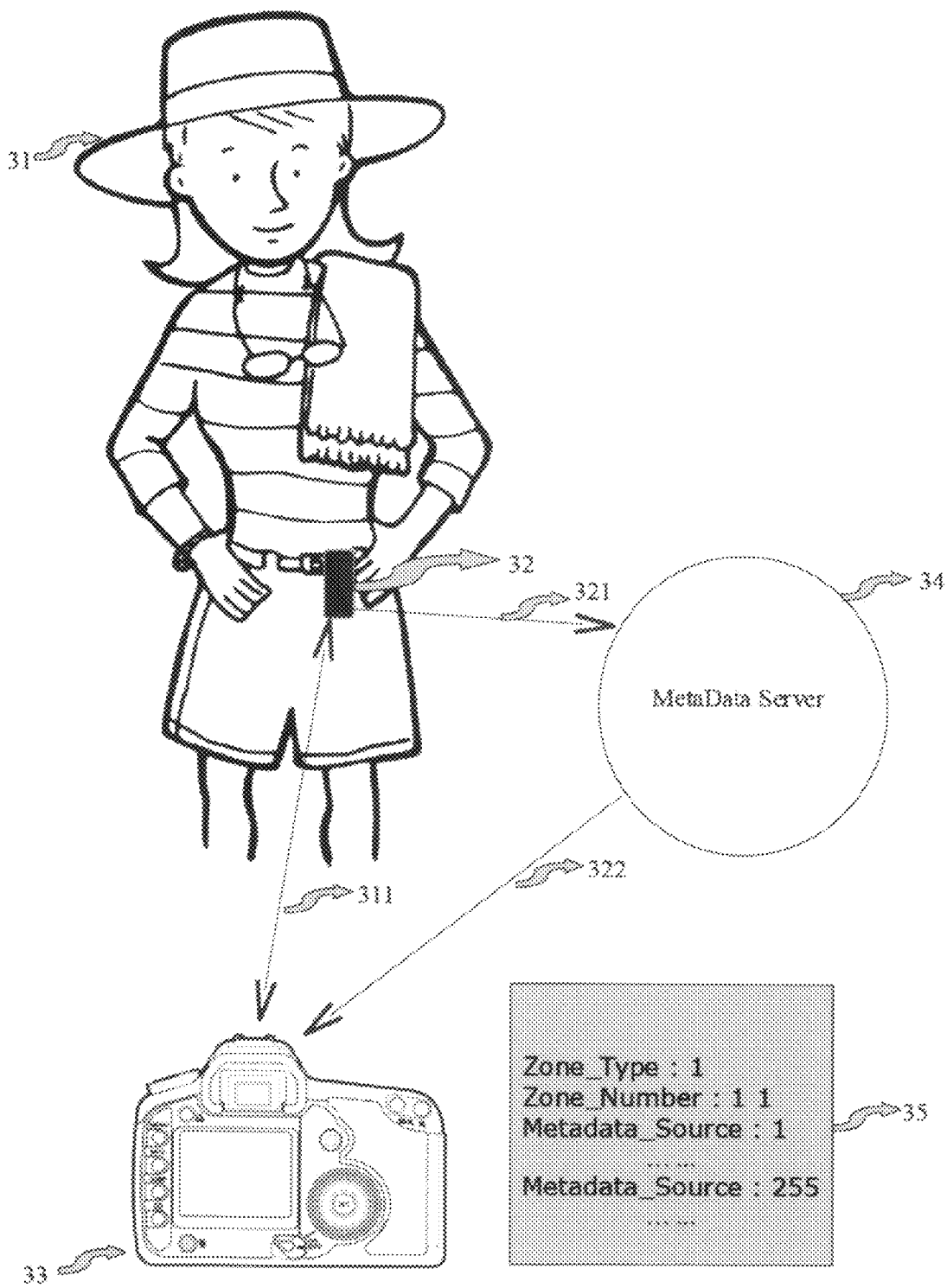
FIG. 2 illustrates obtaining metadata from surrounding devices in an embodiment.

Metadata may also be obtained from devices in an environment where media files are captured, for example. FIG. 2 illustrates obtaining metadata from surrounding devices in an embodiment. The dedicated networked device 32 (e.g. a smartphone) can provide metadata for a networked capture device 33 (e.g. a camera). This can be useful for the following cases: 1) the device 33 cannot support many metadata features as well as device 32 (GPS, Compass, etc); 2) The distance separating devices 33 and 32 is far enough and their metadata is different (e.g. aerial capture), among other situations. The communication methods between devices 32 and 33 can involve a server receiving information from device 32 and sending data to device 33, and may further involve a query from device 33 to device 32 to request that data be sent to the server. One may use a peer-to-peer connection (e.g. connection 311) to exchange data directly, or may use connection 311 to request that device 32 send data to server 34 along connection 321, and then retrieve data from server 34 along connection 322, for example. Thereby, metadata 35 is captured by device 33 contemporaneously with capture of media data by device 33.

Figure 11:
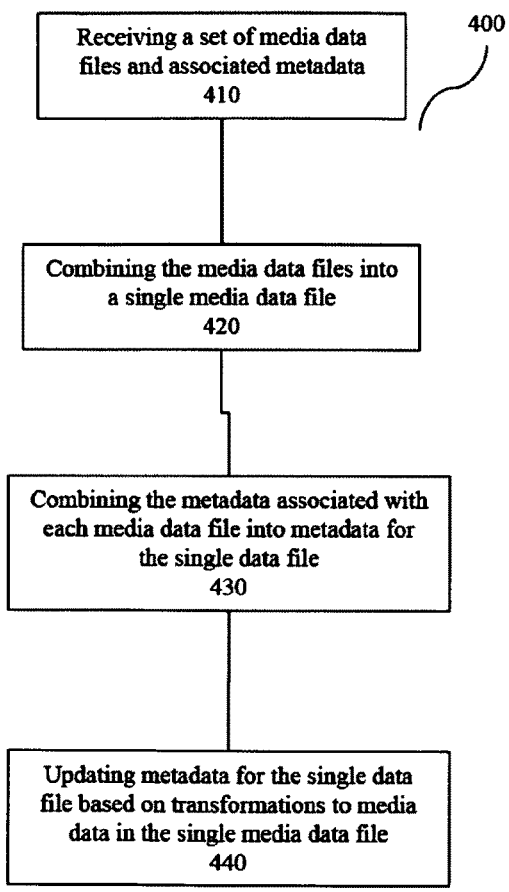
FIG. 11 illustrates an example of a process of concatenating metadata and media data in an embodiment.

FIG. 11 illustrates an example of a process of concatenating metadata and media data in an embodiment. Process 400 involves concatenating or otherwise combining media files and associated enhanced metadata. At module 410, a set of media files and associated metadata is received. At module 420, the media data files are combined into a single combined media data file.

At module 430, the metadata for each media data file is combined into metadata for the single combined media data file. This may involve creating a metadata repository for the combined media file, for example. It may also involve adding type information about metadata received for the various source media files of module 410, for example.

At module 440, the combined metadata is adjusted to reflect the combined media file, rather than the source files received at module 410. This may involve adjusting indicia from the metadata to reflect where the original media data is in the single combined media data file, for example. It may also involve adding indicia, such as timestamps or byte ranges for metadata where no such data was previously present in the received metadata.

Figure 3:
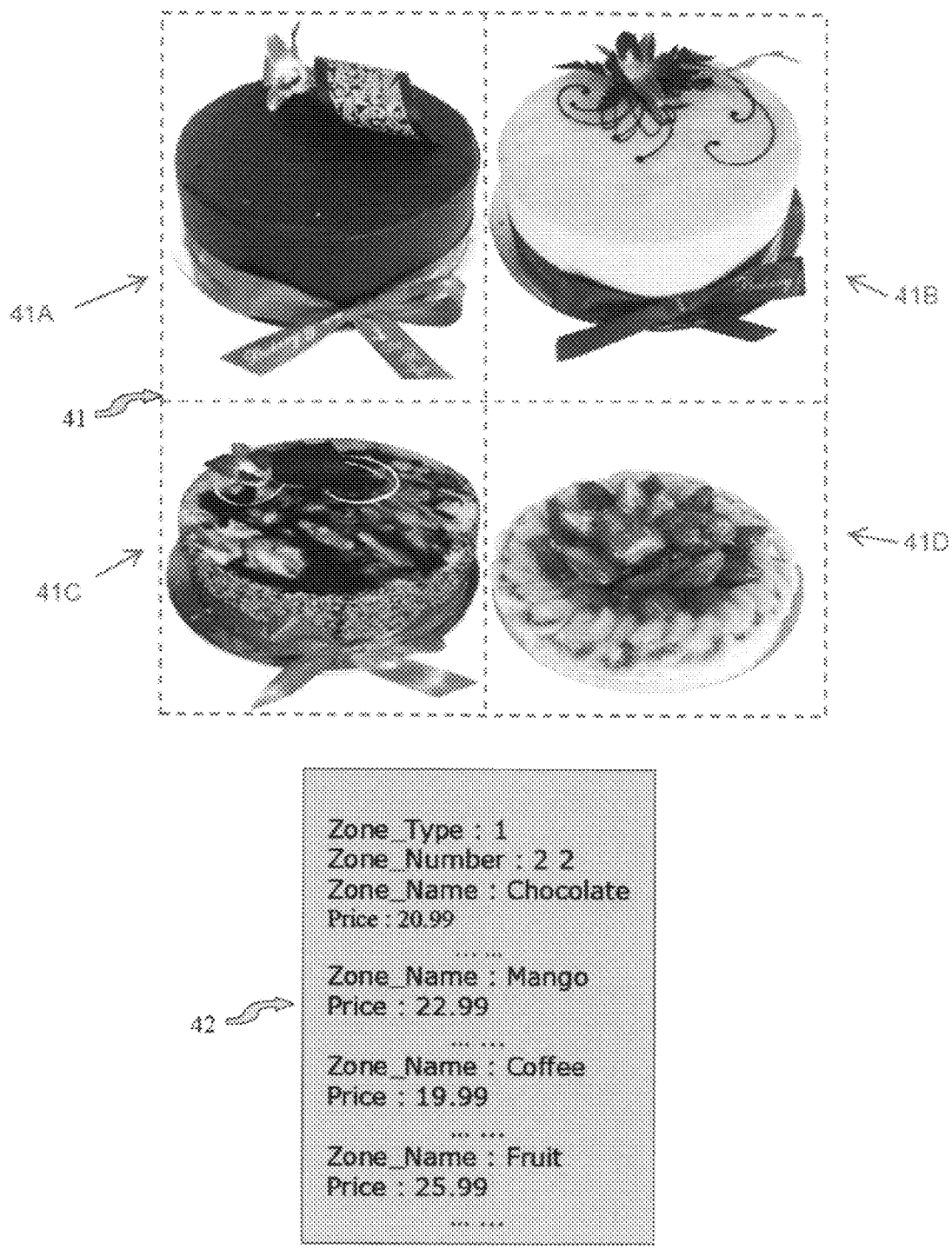
FIG. 3 illustrates an image with zones and accompanying metadata in an embodiment.

FIG. 3 illustrates an image with zones and accompanying metadata in an embodiment. Image 41 includes four zones 41A, 41B, 41C and 41D. Each zone is numbered and named in metadata 42, which provides names of the zones and pricing for the media data content of each zone. Thus, one may use image 42 and associated metadata to display pricing for different zones of image 42, on a website, for example.

Figure 4:
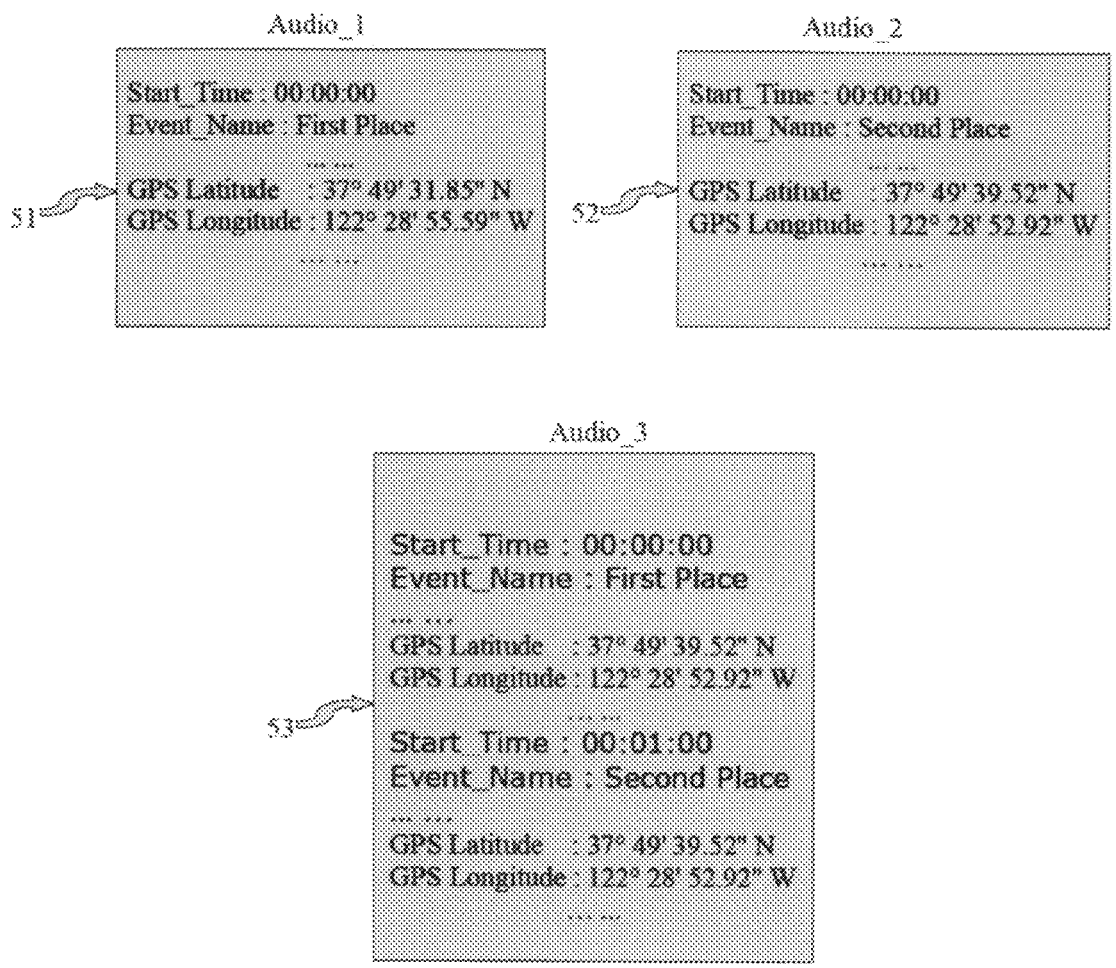
FIG. 4 illustrates audio-related metadata in an embodiment.

FIG. 4 illustrates audio-related metadata in an embodiment. Audio file 1 as shown in metadata 51 has associated metadata, and audio file 2 has associated metadata in metadata 52. Audio file 3 is composed of a merger (e.g. a concatenation) of audio file 1 and audio file 2. The two sets of metadata (51 and 52) are combined and preserved, with metadata 52 adjusted so that it refers to an index (time index) in audio file 3 which corresponds to the data of audio file 2. One may combine such data through the process of FIG. 11, for example.

Figure 12:
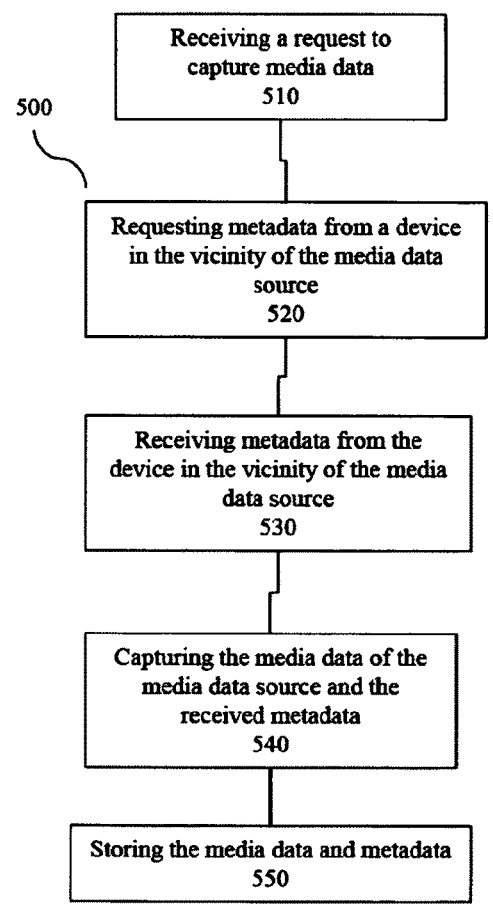
FIG. 12 illustrates an example of a process of receiving metadata from an external source and media data in an embodiment.

FIG. 12 illustrates an example of a process of receiving metadata from an external source and media data in an embodiment. Process 500 involves capturing metadata from another device and capturing media data, potentially at the same time or contemporaneously. At module 510, a media capture device receives a request to capture media data. At module 520, the media device requests data from an external device in the vicinity of the data capture (e.g. near the source of media data to be captured). The data of the external device is to become metadata.

At module 530, the media capture device receives data from the external device. At module 540, the media data is also captured by the media data capture device. Module 540 may also involve capturing the metadata of the external device, for example. At module 550, the media data and metadata are stored.

Figure 5:
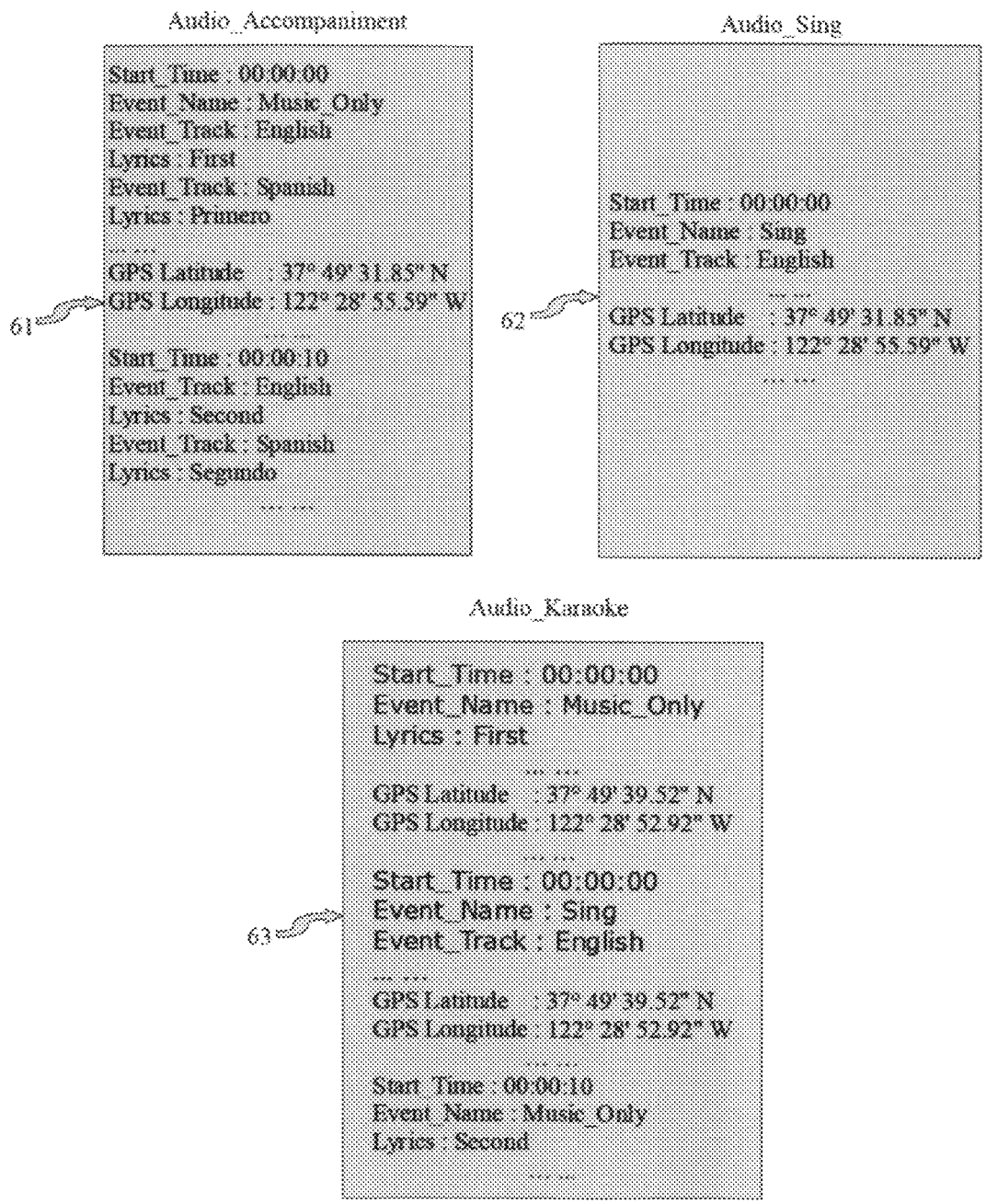
FIG. 5 illustrates another example of audio-related metadata in an embodiment.

FIG. 5 illustrates another example of audio-related metadata in an embodiment. Rather than concatenating audio data, one may wish to mix audio data, while maintaining original metadata from the mixed sources of audio data, such as in a karaoke recording. Metadata 61 is data for an audio accompaniment file, which metadata 62 is data for an audio singing (vocal) track. Metadata 63 provides the metadata for a combined track, with both the accompaniment and vocal data mixed in the karaoke file and the corresponding metadata providing metadata from both sources, associated to the same segment of audio data, even though the metadata thus is associated with overlapping segments of data.

Figure 6:
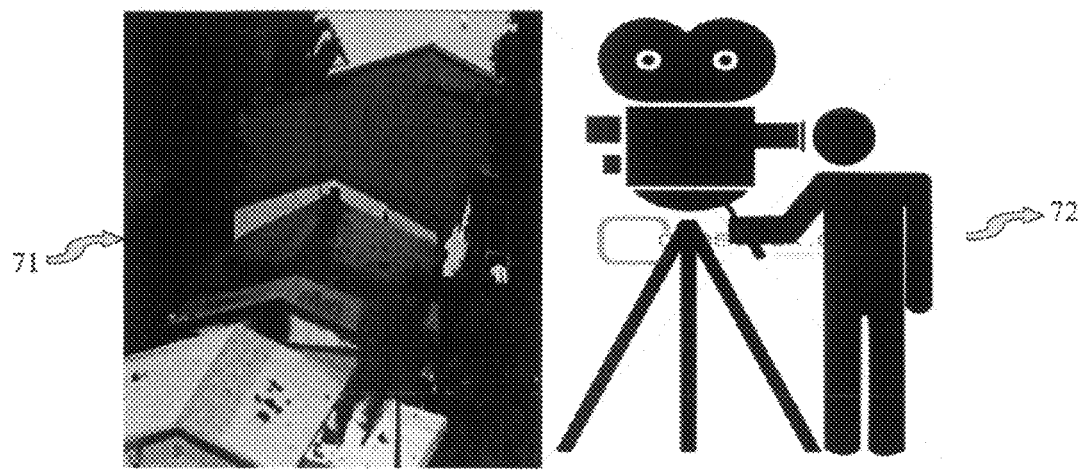
FIG. 6 illustrates an example of video-related metadata in a composite video stream in an embodiment.

FIG. 6 illustrates an example of video-related metadata in a composite video stream in an embodiment. Stream 71 is a feed from a camera (and may come from multiple cameras at different locations over time. Stream 72 is a feed from a studio, and may also come from multiple in-studio cameras over time. Metadata 73 captures data about the two feeds over time. Metadata 73 provides zones for the two feeds in the image (zone 1 and zone 2) and provides metadata information about the two feeds associated with timestamps for the two feeds. Thus, location for each feed can be recorded and saved as part of the metadata (and used at a later time as a result).

Figure 7:
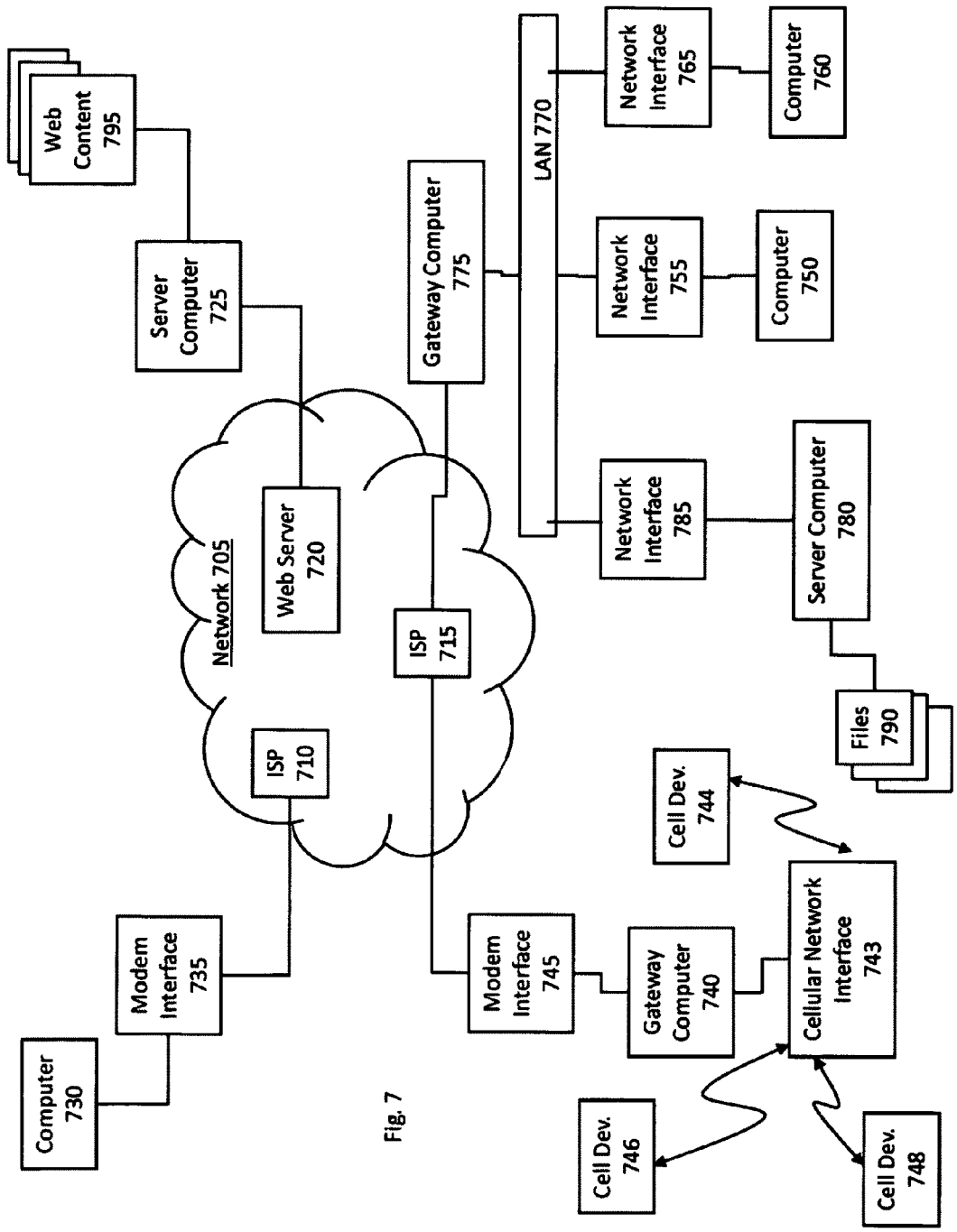
FIG. 7 illustrates an example of a computer network in an embodiment.
Figure 8:
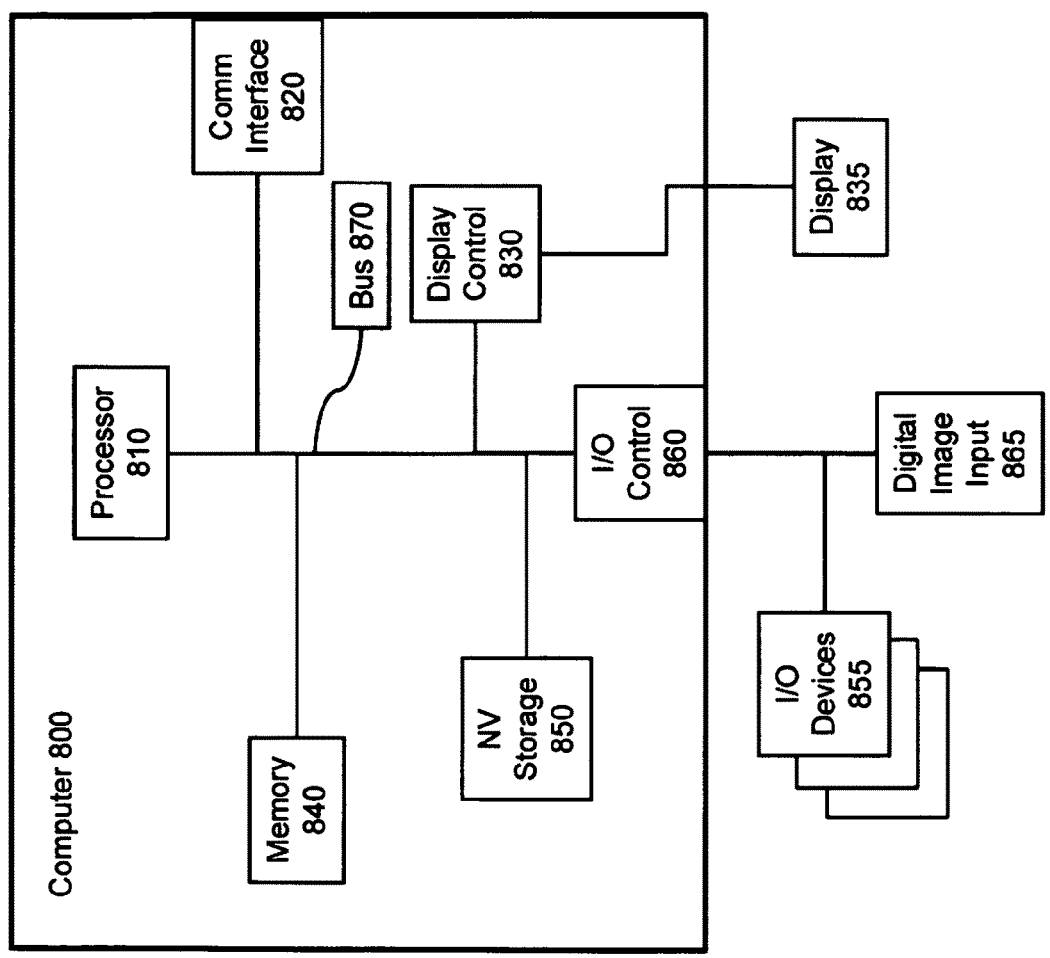
FIG. 8 illustrates an example of a computer of machine in an embodiment.

FIG. 7 illustrates an example of a computer network in an embodiment. FIG. 8 illustrates an example of a computer of machine in an embodiment. The following description of FIGS. 7-8 is intended to provide an overview of device hardware and other operating components suitable for performing the methods of the invention described above and hereafter, but is not intended to limit the applicable environments. Similarly, the hardware and other operating components may be suitable as part of the apparatuses described above. The invention can be practiced with other system configurations, including personal computers, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Cellular network interface 743 provides an interface between a cellular network and corresponding cellular devices 744, 746 and 748 on one side, and network 705 on the other side. Thus cellular devices 744, 746 and 748, which may be personal devices including cellular telephones, two-way pagers, personal digital assistants or other similar devices, may connect with network 705 and exchange information such as email, content, or HTTP-formatted data, for example. Cellular network interface 743 is coupled to computer 740, which communicates with network 705 through modem interface 745. Computer 740 may be a personal computer, server computer or the like, and serves as a gateway. Thus, computer 740 may be similar to client computers 750 and 760 or to gateway computer 775, for example. Software or content may then be uploaded or downloaded through the connection provided by interface 743, computer 740 and modem 745.

Client computer systems 730, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 750 and 760, although as shown in FIG. 7, the connections are not the same as for more directly connected computer systems. Client computer systems 750 and 760 are part of a LAN coupled through a gateway computer 775. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a personal device that can be used as a cellular telephone (744, 746 or 748) or similar personal device. Such a device can be used to perform many functions depending on implementation, such as telephone communications, two-way pager communications, personal organizing, or similar functions. The system 800 of FIG. 8 may also be used to implement other devices such as a personal computer, network computer, or other similar systems. The computer system 800 interfaces to external systems through the communications interface 820. In a cellular telephone, this interface is typically a radio interface for communication with a cellular network, and may also include some form of cabled interface for use with an immediately available personal computer. In a two-way pager, the communications interface 820 is typically a radio interface for communication with a data transmission network, but may similarly include a cabled or cradled interface as well. In a personal digital assistant, communications interface 820 typically includes a cradled or cabled interface, and may also include some form of radio interface such as a Bluetooth or 802.11 interface, or a cellular radio interface for example.

The computer system 800 includes a processor 810, which can be a conventional microprocessor such as an Intel Pentium microprocessor or Motorola power PC microprocessor, a Texas Instruments digital signal processor, or some combination of the two types or processors. Memory 840 is coupled to the processor 810 by a bus 870. Memory 840 can be dynamic random access memory (dram) and can also include static ram (sram), or may include FLASH EEPROM, too. The bus 870 couples the processor 810 to the memory 840, also to non-volatile storage 850, to display controller 830, and to the input/output (I/O) controller 860. Note that the display controller 830 and I/O controller 860 may be integrated together, and the display may also provide input.

The display controller 830 controls in the conventional manner a display on a display device 835 which typically is a liquid crystal display (LCD) or similar flat-panel, small form factor display. The input/output devices 855 can include a keyboard, or stylus and touch-screen, and may sometimes be extended to include disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the device 800.

The non-volatile storage 850 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 800. Rather, a mass storage device on another computer is typically used in conjunction with the more limited storage of the device 800. Some of this data is often written, by a direct memory access process, into memory 840 during execution of software in the device 800. One of skill in the art will immediately recognize that the terms "machine-readable medium" or "computer-readable medium" includes any type of storage device that is accessible by the processor 810 and also encompasses a carrier wave that encodes a data signal.

The device 800 is one example of many possible devices which have different architectures. For example, devices based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

In addition, the device 800 is controlled by operating system software which includes a file management system, such as a disk operating system, which is part of the operating system software. One example of an operating system software with its associated file management system software is the family of operating systems known as Windows CE® and Windows® from Microsoft Corporation of Redmond, Wash., and their associated file management systems. Another example of an operating system software with its associated file management system software is the Palm® operating system and its associated file management system. The file management system is typically stored in the non-volatile storage 850 and causes the processor 810 to execute the various acts required by the operating system to input and output data and to store data in memory, including storing files on the non-volatile storage 850. Other operating systems may be provided by makers of devices, and those operating systems typically will have device-specific features which are not part of similar operating systems on similar devices. Similarly, WinCE® or Palm® operating systems may be adapted to specific devices for specific device capabilities.

Device 800 may be integrated onto a single chip or set of chips in some embodiments, and typically is fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 10:
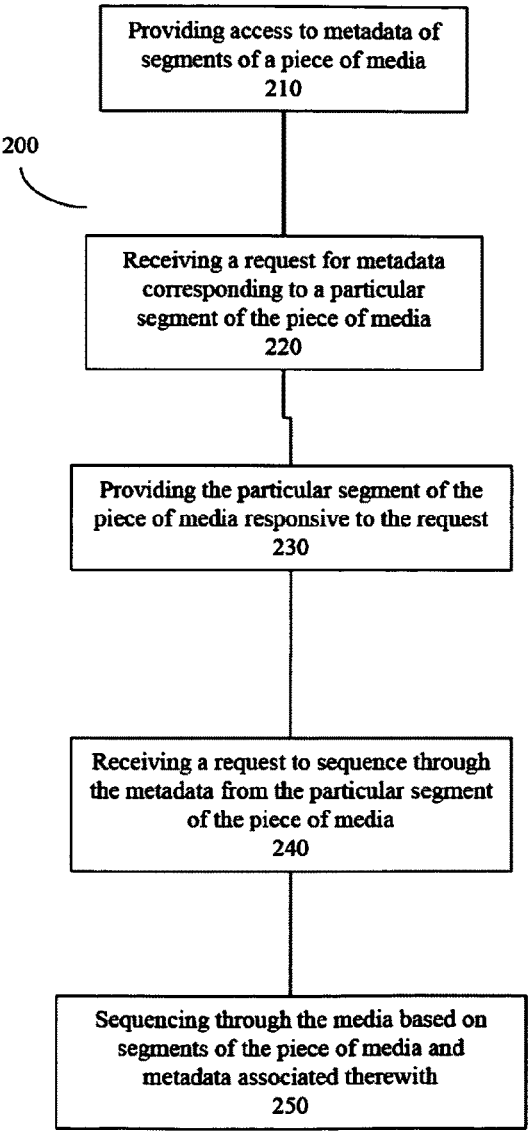
FIG. 10 illustrates an example of a process of accessing enhanced metadata and related media data in an embodiment.

FIG. 10 illustrates an example of a process of accessing enhanced metadata and related media data in an embodiment. Process 200 initiates with module 210, where access to metadata of a media file is provided. This may be through a user interface which displays such metadata, for example. It may also be through a user interface which graphically represents such data, such as a slider bar for a time scale or a map for geographic locations, or pictures for individuals identified as associated with data (e.g. speakers on a tape).

At module 220, a request for metadata corresponding to a segment of a media file is received. Thus, one has the metadata available, and requests to see or hear the associated media data (e.g. media data from a specific place or time). At module 230, the corresponding media data is retrieved and provided to the requestor. Thus, if one recorded video of a drive from a home to a school, one could choose a position along the route and request the associated video data—and then receive a video data segment which plays the recording for the specific location. Similarly, one could see a name of a zone in a photograph and request media data, at which point the zone of the photo/image would be highlighted, for example.

Another option is to sequence through media data from an identified segment. At module 240, a request is received to sequence through the media data from the media segment of module 230. At module 250, the media data is sequenced through, such as by playing video or audio data through an appropriate player, starting with the media segment of module 230. Thus, one could request a segment where an identified speaker was talking in an audio clip, and then sequence through the rest of the audio clip, for example.

FIG. 13 illustrates an example of a data structure for media data with enhanced metadata in an embodiment. Structure 600 shows the media data in segments (numbered for reference) and shows associated metadata. This may be handled in a variety of ways. For example, tables in a database may store data for segments, with media data in one table and metadata in another table. Additionally, the media data may be stored in a legacy format, with metadata stored as additional data including references to the media data. Examples of this include using references such as pointers to byte ranges, timestamps, coordinates for a zone, and other indicia.

FIG. 14 illustrates another example of a data structure for media data with enhanced metadata in an embodiment. In the associated structure 700, there are dedicated timestamps for the beginning of each media segment, with associated metadata (M1-MN) and associated media data (D1-DN). For an audio file, the segments would be played sequentially (normally), with associated media data played and associated metadata made available. A similar approach would work for a video file, for example.

Figure 15:
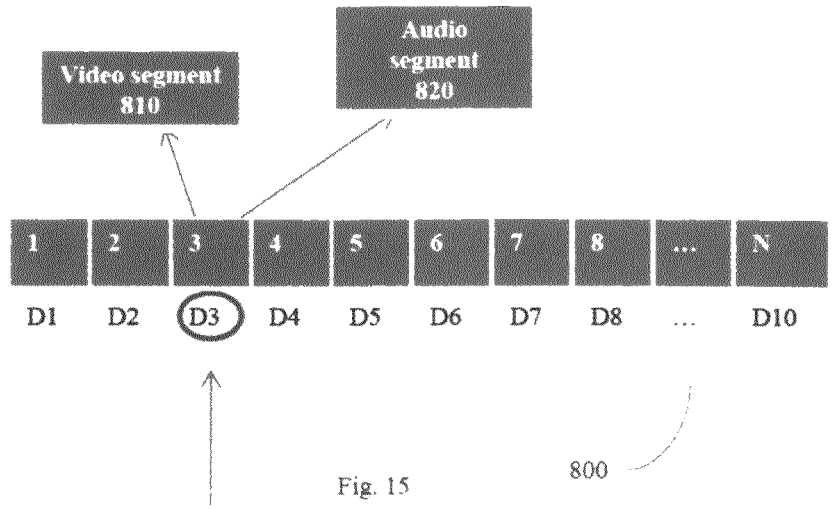
FIG. 15 illustrates an example of a data structure for media data without metadata in an embodiment.

FIG. 15 illustrates an example of a data structure for media data without metadata in an embodiment. The media data is sequentially included in the data file, and accessing a part of the data file accesses a given index into the file, without more. One can only access the file through access of indexes into the data in question, and for video data would access video data 810 or for audio data would access audio data 820. Note—the indices 1-N are provided for convenience of illustration, and do not represent segmentation.

Figure 16:
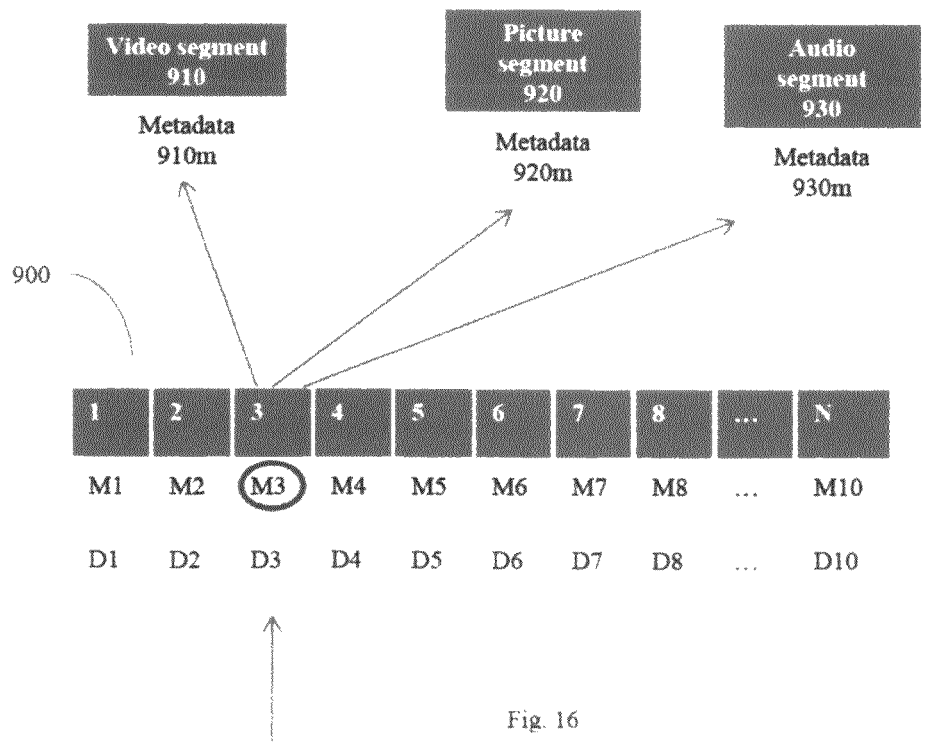
FIG. 16 illustrates an example of the data structure of FIG. 14 as it may be accessed for various types of media.

FIG. 16 illustrates an example of the data structure of FIG. 14 as it may be accessed for various types of media. With metadata M1-MN available for data throughout the file, one can access data based on metadata in the file and find corresponding data. Thus, one can access metadata M3, which may be a geographic location, name of a place, speaker name, or other data, and thereby access a corresponding segment. Thus, one selecting M3 would access a corresponding data segment D3. For video data, this would be video segment 910 and corresponding metadata 910m. For audio data this would be audio segment 930 and corresponding metadata 930m. For a picture or image, this would be picture segment 920 (e.g. a zone) and corresponding metadata 920m. Thus, one could point on a map to a location which was part of metadata for a media file, and then get the corresponding segment of the media file, along with other media, for example.

An example of a more specific implementation is provided in the following material. The details of this embodiment illustrate some of the considerations which may be involved in implementing enhanced metadata in media files.

The following tags are supported in multimedia file via EXIF tags format in an embodiment:

Geo-information: Compass, temperature, humidity, etc;
Medical information: Pulse, blood pressure, glucose, etc;
Business information: Price, review level, etc;
Role name (one or plural);
Reference URL;
Lyrics (for audio/video file only);
Comment.

Plural zone-based tags are supported for image or video files, for example. The first tag may be:

Zone_Type defining the plural zones style and the following styles may be predefined:
0 Coordinate Style
1 Number Style For Coordinate style, the Zone_XY (Zone_XYZ for 3D file) tags define each zone via a series of point coordinate (X, Y) or (X, Y, Z) for 3D.

For Number Style, the Zone_Number defines same size zones by vertical and horizontal number. For example, Zone_Number 2 3 will define 2×3=6 zones with same size. One more number is needed for a 3D file, to define the number of zones along a third or z-axis.

There is only a single zone for audio file, but there may be segments for an audio file.

Each zone includes a Zone_Name (optional for audio), which is optional.
Event_Track (audio/video),
Start_Time (audio/video),
Event_Name (audio/video),
optional Event_Channel (audio/video), optional
Metadata_Source,
standard EXIF tags and/or the tags mentioned above.

Such zones in an image file may be coordinate based, for example.

If no Event_Track or Event_Channel is defined for audio/video file, the metadata will be applied to all tracks or all channels of the file.

The following number is predefined for Metadata_Source:
0 The storage device;
1-8 The capture/recording device 1-8 (there are 6-8 capture devices for 3D file);
255 The object itself.

If no Metadata_Source is defined, the default is capture/recording device.

A dedicated storage device could add its own metadata via the Metadata_Source(0) tag defined above.

Dedicated wired or wireless networked device provide an object itself metadata via the Metadata_Source(255) tag defined above before writing the file. The device can be a remote controller to control and transfer metadata to the capture/recording device. Alternatively, it can be a metadata provider only.

There are two methods to implement metadata and control messages transfer in this embodiment:
1) Directly communication between metadata/control messages sender and receiver.
2) Communication via a dedicated metadata server.
   a) The sender logs in to the server and sends the time stamp and metadata;
   b) The receiver logs in to the server with same account and fetches the newest metadata by timestamp index.

There are three methods to store the metadata in this embodiment: embedded into original file; separate file; local or networked dedicated database. The embedded metadata and methods may use EXIF format for best compatibility in such an embodiment. For a separate file, a dedicated file with same name but different extension is created. One may also use a big dedicated file which include all file names and associated metadata, the data structure format can be EXIF, XML or even binary, for example. For a database method, all metadata will be stored into one or plural databases and indexed by file name, for example. For an index approach, a metadata ID will be used and the detailed metadata will be stored in central database. The following is an example:

Original Metadata:
GPS Latitude: 37° 49' 31.85" N
GPS Longitude: 122° 28' 55.59" W
ID data:
GPS Location ID: 123
Central Database:
GPS Location ID: 123
GPS Latitude: 37° 49' 31.85" N
GPS Longitude: 122° 28' 55.59" W If plural image/video files are merged into a new file with different zones, all metadata tags will be copied into their own zones in the new file. For those 2D files with same object but different Metadata_Source (capture devices), the new file will be a 3D file, for example. If plural audio/video files are appended into a new file, all metadata tags will be copied into new different Time_Start tags in the new file. If one or plural zone(s) are cut from an image/video file, associated zone tags and related metadata will be deleted as well. If one or plural clip(s) are cut from an audio/video file, associated Time_Start tags will be deleted and all Time_Start tag(s) will be recalculated. If an image/video file is split to plural files based on different zones, each zone metadata tags of the old file will be copied into corresponding new files based on which file has a given zone or segment. For a 3D file, after split those new files will become 2D files if only one source is involved. If an audio/video file is split to plural files based on different Time_Start, the metadata tags of the old file will be copied into corresponding new file and all Time_Start tags in new file will be recalculated.

This embodiment can be used with but is not limited to the following devices: computer (software/hardware), smartphone, PDA, media player/recorder, camera, camcorder, digital photo frame, monitor/TV or other photo/audio/video devices.

Note that one can expect to use various data formats and embodiments in various different ways. For example, one may use segments in various different ways in different embodiments, and the segments of one file format may be different from segments for another file format which are related to the same media source. Also, a media file need not be a single file, but may be multiple groupings of data organized as files, entries in a database, or otherwise distributed. Similarly, metadata may be stored in a file with media data, in a separate file, or otherwise associated with media data. Thus, metadata and media data may be distributed in various ways and still be thought of as part of a file as a result of how the data is perceived by a user, for example.

Various embodiments provide plural zone-based or time-based metadata for every single multimedia file including image, audio and video. Related applications of this approach are also included as well in various embodiments. Various embodiments can support plural zone-based metadata tags and implement picture-in-picture tags, for example. Various embodiments can support all kinds of metadata including geo-information. This can facilitate implementation of a Space-Time multimedia system with some embodiments. Various embodiments provide a server-based method for metadata communication. In an embodiment, a metadata ID is introduced for commonly used metadata (such as some famous location GPS information). Tags for 3D file are also supported in some embodiments.

One skilled in the art will appreciate that although specific examples and embodiments of the system and methods have been described for purposes of illustration, various modifications can be made without deviating from present invention. For example, embodiments of the present invention may be applied to many different types of media, systems and components. Moreover, features of one embodiment may be incorporated into other embodiments, even where those features are not described together in a single embodiment within the present document.

The invention claimed is:

1. A method implemented in a media processing device by performing processing steps, comprising:
   receiving metadata and media data of a plurality of media data files wherein each of the metadata providing contextual information corresponding to one of the media data files;
   combining the media data of the plurality of media data files into a combined media data file;
   combing the metadata of the plurality of media data files into a combined metadata file corresponding to the merged single media data file wherein the combined metadata file is separated into different metadata segments each having a header to identify and associate each of the metadata segments to one of the plurality of media data files; and
   displaying or playing the plurality of media data files simultaneously or continuously as a merged single media data file according to the combined metadata file.

2. The method of claim 1, wherein:
   the header for each of the metadata segments of the combined metadata file having a sequential order associated with a corresponding sequential order of merging the plurality of media data files into the merged single media data file.

3. The method of claim 1, wherein:
   each of the media data files comprises image data of a different photograph wherein each of said metadata segment in the combined metadata file corresponds to one of the media data files of the merged single media data file for simultaneously displaying the image data of the different photographs.

4. The method of claim 1, wherein:
   each of the media data files comprises video image data wherein each of said media files combined as a single merged video data file each corresponding to a metadata segment in the combined metadata file for display the single merged video data file as a single video media file.

5. The method of claim 1, wherein:
   each of the media data files comprises image data of a different photograph and audio data of a different audio file corresponding to the metadata segments the combined metadata file for displaying the single merged data file as a merged single photograph and simultaneously playing the different audio files as a merged single audio file.

6. The method of claim 1, wherein:
   each of the media data files comprises audio data corresponding to a metadata segment in the combined metadata file for playing the merged single media data file as a merged single audio file.

7. The method of claim 1, wherein:
   each of the media data files comprises text data corresponding to a metadata segment in the combined metadata file for processing the merged single media data file as a merged single text file.

8. The method of claim 1, wherein:
   each of the media data files comprises recorded data of a web surfing session corresponding to a metadata segment in the combined metadata file for displaying and processing the merged single media data file as a merged single web file.

9. The method of claim 1, wherein:
   each of the media data files comprises image data, video data and audio data corresponding to a metadata segment in the combined metadata file for displaying and processing the merged single media data file as a merged single multimedia file.

10. A method implementing in a media process device by performing processing steps, comprising:
    receiving a request to access a section of media data file as part of a combined media data file associated with a corresponding combined metadata file wherein the request includes a searchable pointer for pointing to a specific metadata in a specific metadata segment in a the combined metadata file;
    finding the specific metadata in a the specific metadata segment of the combined metadata file corresponding to the combined media data file;
    looking up a section in the combined media data file corresponding to the specific metadata in the specific metadata segment of the combined metadata file; and
    providing the section of the media data in the combined media data file corresponding to the specific metadata in the specific the specific metadata segment of the combined metadata file.

11. The method of claim 10, wherein:
    the step of providing the section of the media data in the combined media data file further includes a step of displaying the section of the media data corresponding to the specific metadata in the specific metadata segment.

12. The method of claim 10, wherein:
    the step of providing the section of the media data in the combined media data file further includes a step of playing the section of the media data corresponding to the specific metadata in the specific metadata segment.

13. The method of claim 10, wherein:
    the step of providing the section of the media data in the combined media data file further includes a step of highlighting the section of the media data in the combined media data file corresponding to the specific metadata in the specific metadata segment.

14. The method of claim 10, wherein:
    the step of receiving the request further including a step of receiving the request comprising a pointer to a plurality of metadata segments in the combined metadata file; and
    the step of providing the section in the combined media data file includes a step of playing the section of the media data in the combined media data file corresponding to the plurality of metadata segments in the combined metadata file sequentially following the pointer in the request.

* * * * *